(12) United States Patent
Shi (10) Patent No.: US 10,993,235 B2
(45) Date of Patent: Apr. 27, 2021

(54) BWP SWITCHING METHOD AND APPARATUS, AND TERMINAL DEVICE

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/896,984

(22) Filed: Jun. 9, 2020

(65) Prior Publication Data
US 2020/0305162 A1 Sep. 24, 2020

Related U.S. Application Data

(63) Continuation of application No. PCT/CN2019/085834, filed on May 7, 2019.

(30) Foreign Application Priority Data

Jun. 21, 2018 (CN) .......................... 201810646706.3

(51) Int. Cl.
H04W 72/04 (2009.01)
H04W 72/02 (2009.01)
H04W 74/08 (2009.01)

(52) U.S. Cl.
CPC ....... *H04W 72/0453* (2013.01); *H04W 72/02* (2013.01); *H04W 74/0833* (2013.01)

(58) Field of Classification Search
CPC .......................... H04W 72/0453; H04W 72/02
(Continued)

(56) References Cited

U.S. PATENT DOCUMENTS

2018/0123765 A1 5/2018 Cao et al.
2019/0254042 A1* 8/2019 Cirik .................. H04W 56/001
(Continued)

FOREIGN PATENT DOCUMENTS

RU 2628011 C2 8/2017
WO 2018030864 A1 2/2018
(Continued)

OTHER PUBLICATIONS

Corrections to BWP Operation 3GPP TSG RAN WGI Meeting #93 RI-1807270, May 25, 2018 (May 25, 2018), entire document.
(Continued)

*Primary Examiner* — Peter G Solinsky
(74) *Attorney, Agent, or Firm* — Perkins Coie LLP (57) ABSTRACT

The implementations of the present disclosure provide a BWP switching method and apparatus, and a terminal device. The method comprises: a terminal device acquiring first configuration information, wherein the first configuration information comprises first resource information and identifier information of a first search space, the first resource information is used for initiating a random access process, the identifier information of the first search space is used for detecting a downlink control channel, the first configuration information corresponds to a first BWP, and the first search space corresponds to a second BWP; and where the first BWP is in an activated state, the terminal device switching the second BWP to an activated state or maintaining the second BWP in an activated state, and executing the random access process on the first BWP and the second BWP.

16 Claims, 3 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2019/0306842 | A1* | 10/2019 | Cirik | H01M 10/48 |
| 2019/0306867 | A1* | 10/2019 | Cirik | H04W 74/006 |
| 2019/0306909 | A1* | 10/2019 | Zhou | H04B 7/08 |
| 2019/0319833 | A1* | 10/2019 | Nagaraja | H04W 36/0085 |

FOREIGN PATENT DOCUMENTS

| | | | |
|---|---|---|---|
| WO | 2018082572 | A1 | 5/2018 |
| WO | 2018085145 | A1 | 5/2018 |

OTHER PUBLICATIONS

RACH procedure with BWP 3GPP TSG RAN WGI Meeting AH 1801 RI-1800647, Jan. 26, 2018 (Jan. 26, 2018), part II Discussion and part III Conclusions.

3GPP TSG-RANI Meeting #93 RI-1807957, May 25, 2018 (May 25, 2018), sections 8 and 10.

International Search Report dated Jul. 26, 2019 of PCT/CN2019/085834.

3GPP TS 38.321 V15.8.0 (Dec. 2019)—3rd Generation Partnership Project; Technical Specification Group Radio Access Network; NR; Medium Access Control (MAC) protocol specification—(Release 15) (78 pages).

3GPP TSG RAN WG1 Meeting #93—Busan, South Korea, May 21-25, 2018—R1-1806789—MediaTek Inc., Remaining Issues on Beam Failure Recovery (4 pages).

3GPP TSG-RAN WG2#102—Busan, Korea, May 21-25, 2018—R2-1806991—CATT, Further issues with switching of bandwidth part and random access (6 pages).

Decision to Grant of Russian Patent Application No. 2020129891, dated Dec. 7, 2020 (15 pages).

Supplementary European Search Report dated Jan. 14, 2021 of European Patent Application No. 19822687.0 (9 pages).

Examination Report No. 1 of Australian Application No. 2019291417, dated Feb. 11, 2021.

* cited by examiner

FIG. 1

A terminal device acquires first configuration information, wherein the first configuration information includes first resource information and identifier information of a first search space, the first resource information is configured to initiate a random access process, the identifier information of the first search space is configured to detect a downlink control channel, the first configuration information corresponds to a first BWP, and the first search space corresponds to a second BWP — 201

The terminal device switches the second BWP to an active state or maintains the second BWP in the active state unchanged when the first BWP is in the active state, and performs the random access process on the first BWP and the second BWP — 202

BWP SWITCHING METHOD AND APPARATUS, AND TERMINAL DEVICE

CROSS-REFERENCE TO RELATED APPLICATIONS

This application is a continuation application of International Application No. PCT/CN2019/085834 filed on May 7, 2019, which claims the priority to Chinese Patent Application No. 201810646706.3 filed on Jun. 21, 2018, and the entire disclosures of both applications are hereby incorporated by reference.

TECHNICAL FIELD

Implementations of the present disclosure relate to the technical field of mobile communication, in particular to a Band Width Part (BWP) switching method and apparatus, and a terminal device.

BACKGROUND

When a terminal initiates a Random Access Channel (RACH) process including a RACH process triggered by Beam Failure Recovery (BFR), the terminal first determines whether a RACH resource is configured on an uplink BWP activated currently, and if so, the terminal determines whether an index of a downlink BWP activated currently is consistent with an index of the uplink BWP activated currently. If the index of the downlink BWP activated currently is consistent with the index of the uplink BWP activated currently, the uplink BWP and downlink BWP activated currently are maintained and the RACH process is initiated. If the index of the downlink BWP is inconsistent with the index of the uplink BWP, the downlink BWP activated currently is switched to a downlink BWP with the same index as that of the uplink BWP activated currently, and then the RACH process is initiated.

However, in this BWP handover process, there is a following problem for the RACH process triggered by the BFR (simply referred to as BFR RACH).

On the uplink BWP activated currently, not only a RACH resource is configured, but also an ID of SearchSpace (referred to as recoverySearchSpaceID) is configured, and the ID of the SearchSpace is bound to a downlink BWP. If the terminal switches a downlink BWP a activated currently to another BWP b when initiating a BFR RACH, and there is no ID of SearchSpace configured on the BWP b, then the terminal cannot complete the BFR RACH.

SUMMARY

Implementations of the present disclosure provide a BWP switching method and apparatus, and a terminal device.

An implementation of the present disclosure provides a Band Width Part (BWP) switching method, including: acquiring first configuration information by a terminal device, wherein the first configuration information includes first resource information and identifier information of a first search space, the first resource information is configured to initiate a random access procedure, the identifier information of the first search space is configured to detect a downlink control channel, the first configuration information corresponds to a first BWP, and the first search space corresponds to a second BWP; switching the second BWP to an active state or maintaining the second BWP in the active state unchanged by the terminal device when the first BWP is in the active state, and performing the random access procedure on the first BWP and the second BWP.

An implementation of the present disclosure provides a Band Width Part (BWP) switching apparatus, including: an acquisition unit, configured to acquire first configuration information, wherein the first configuration information includes first resource information and identifier information of a first search space, the first resource information is configured to initiate a random access procedure, the identifier information of the first search space is configured to detect a downlink control channel, the first configuration information corresponds to a first BWP, and the first search space corresponds to a second BWP; an activation unit, configured to switch the second BWP to the active state or maintain the second BWP in the active state unchanged when the first BWP is in the active state; and a random access unit, configured to perform the random access procedure on the first BWP and the second BWP.

An implementation of the present disclosure provides a terminal device, including: a processor and a memory. The memory is configured to store a computer program, and the processor is configured to call and run the computer program stored in the memory to execute the BWP switching method described above.

An implementation of the present disclosure provides a chip configured to implement the BWP switching method described above.

Specifically, the chip includes a processor configured to call and run a computer program from a memory and a device disposed with the chip executes the BWP switching method described above.

An implementation of the present disclosure provides a computer readable storage medium configured to store a computer program, and the computer program enables a computer to execute the BWP switching method described above.

An implementation of the present disclosure provides a computer program product including computer program instructions, and the computer program instructions enable a computer to execute the BWP switching method described above.

An implementation of the present disclosure provides a computer program that, when running on a computer, enables the computer to execute the BWP switching method described above.

DETAILED DESCRIPTION

The technical solutions in implementations of the present disclosure will be described below with reference to the drawings in the implementations of the present disclosure. It is apparent that the implementations described are just some implementations of the present disclosure, but not all implementations of the present disclosure. According to the implementations of the present disclosure, all other implementations achieved by a person of ordinary skill in the art without paying an inventive effort are within the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, or a 5G system.

Figure 1:
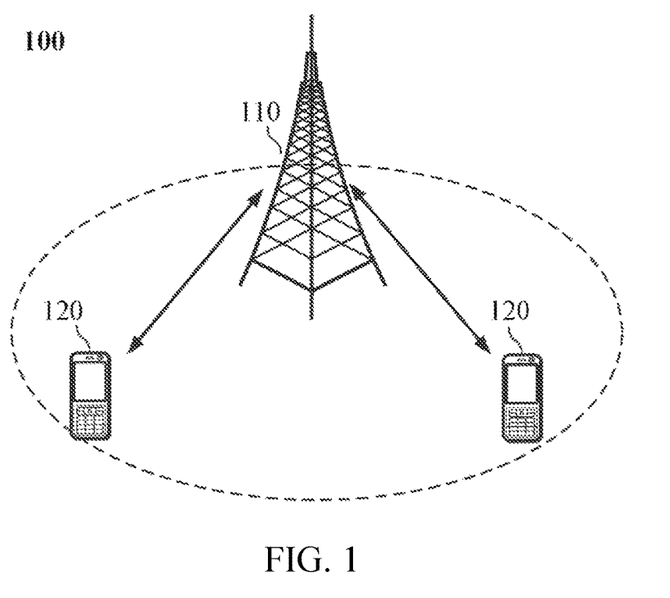
FIG. 1 is a schematic diagram of an architecture of a communication system provided by an implementation of the present disclosure.

Illustratively, a communication system 100 applied in an implementation of the present disclosure is shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in a LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a 5G network, or a network device in a future evolved Public Land Mobile Network (PLMN), etc.

The communication system 100 also includes at least one terminal device 120 located within the coverage area of the network device 110. As used herein, the term "terminal device" includes, but not limited to, a device configured to connect via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, and an AM-FM broadcast transmitter; and/or an apparatus, of another communication terminal, configured to receive/send a communication signal; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communication System (PCS) terminal capable of combining with a cellular wireless telephone and data processing, faxing, and data communication abilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may be referred to an access terminal, a User Equipment (UE), a subscriber unit, a subscriber station, a mobile station, a mobile platform, a remote station, a remote terminal, a mobile device, a user terminal, a terminal, a wireless terminal device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved Public Land Mobile Network (PLMN), or the like.

Optionally, Device to Device (D2D) communication may be performed between the terminal devices 120.

Optionally, the 5G system or 5G network may be referred to as a New Radio (NR) system or a NR network.

FIG. 1 exemplifies one network device and two terminal devices. Optionally, the communication system 100 may include multiple network devices and other quantities of terminal devices may be included within coverage area of each network device. Implementations of the present disclosure are not limited thereto.

Optionally, the communication system 100 may include other network entities such as a network controller, and a mobile management entity. Implementations of the present disclosure are not limited thereto.

It should be understood that, a device with a communication function in a network/system in the implementation of the present disclosure may be referred to as a terminal device. The communication system 100 shown in FIG. 1 is taken as an example, the communication system may include a network device 110 and a terminal device 120 which have communication functions, and the network device 110 and the terminal device 120 may be the specific devices described above, which will not be described here again. The terminal device may also include other devices in the communication system 100, such as network controllers, mobile management entities, and other network entities, and the implementations of the present disclosure are not limited thereto.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

Figure 2:
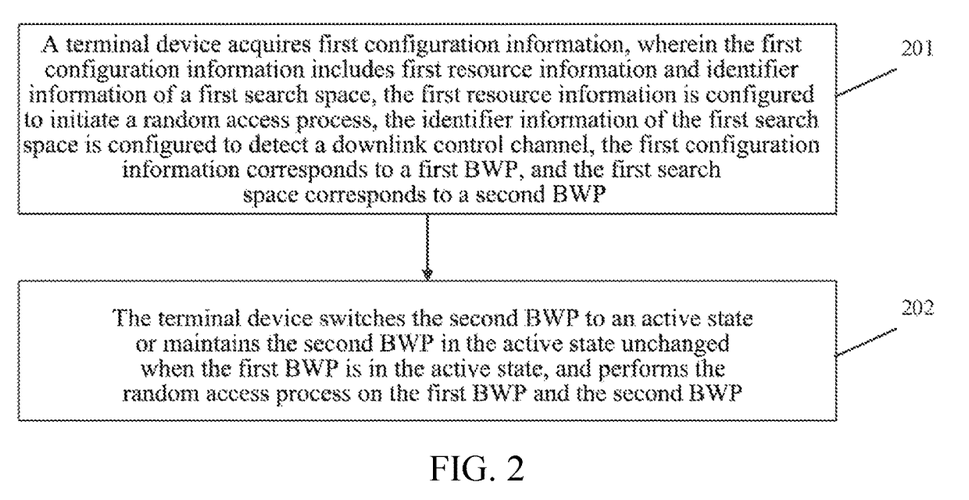
FIG. 2 is a schematic flowchart of a BWP switching method provided by an implementation of the present disclosure.

FIG. 2 is a schematic flowchart of a BWP switching method provided by an implementation of the present disclosure. As shown in FIG. 2, the BWP switching method includes the following acts.

In act 201: a terminal device acquires first configuration information, wherein the first configuration information includes first resource information and identifier information of a first search space, the first resource information is configured to initiate a random access procedure, the identifier information of the first search space is configured to detect a downlink control channel, the first configuration information corresponds to a first BWP, and the first search space corresponds to a second BWP.

In an implementation of the present disclosure, the terminal device may be any device, such as a mobile phone, a tablet computer, a notebook computer, or a desktop computer, which is capable of communicating with network devices.

The random access procedure in an implementation of the present disclosure may be, but is not limited to, a random access procedure triggered by BFR. In one example, the first configuration information may be referred to as BeamFailureRecoveryConfig.

In an implementation of the present disclosure, the first configuration information includes at least two pieces of information, one of which is the first resource information configured to initiate a random access procedure such as a physical random access channel (PRACH), and the other of which is the identifier information of the first search space configured to detect a downlink control channel (e.g., PDCCH). Here, the first configuration information corresponds to the first BWP, that is, the first configuration information is configured on the first BWP. The first search space corresponds to the second BWP.

In an implementation of the invention, the terminal device acquires the first configuration information from a network device.

In an implementation of the present disclosure, the network may configure identifier information of the first BWP to be the same as identifier information of the second BWP. Or, the network randomly configures identifier information of the first BWP and identifier information of the second BWP so that the identifier information of the first BWP and the identifier information of the second BWP may be the same or different.

In act 202: the terminal device switches the second BWP to the active state or maintains the second BWP in the active state unchanged when the first BWP is in the active state, and performs the random access procedure on the first BWP and the second BWP.

The terminal device determines whether an uplink BWP activated currently is the first BWP when a random access condition triggered by Beam Failure Recovery (BFR) is satisfied. The terminal device switches the second BWP to the active state or maintains the second BWP in the active state unchanged when the first BWP is in the active state, and performs the random access procedure on the first BWP and the second BWP.

1) For a case that the network side configures the identifier information of the first BWP and the identifier information of the second BWP to be the same, when the random access condition triggered by Beam Failure Recovery (BFR) is satisfied, the terminal device determines whether the uplink BWP activated currently is the first BWP, that is, determines whether the uplink BWP activated currently is configured with the first configuration information. When the first BWP is in the active state, the terminal device switches the second BWP to the active state or maintains the second BWP in the active state unchanged. The identifier information of the first BWP is the same as the identifier information of the second BWP, the identifier information of the uplink BWP activated currently is the same as that of the activated downlink BWP, and is the same as the identifier information of the BWP corresponding to the first search space, which ensures that the terminal switches the downlink BWP activated currently to a downlink BWP capable of monitoring a PDCCH when performing BFR RACH.

2) For a case that the network side configures the identifier information of the first BWP and the identifier information of the second BWP to be the same or different, when the random access condition triggered by Beam Failure Recovery (BFR) is satisfied, the terminal device determines whether the uplink BWP activated currently is the first BWP, that is, determines whether the uplink BWP activated currently is configured with the first configuration information. When the first BWP is in the active state, the terminal device switches the second BWP to the active state or maintains the second BWP in the active state unchanged. Here, the identifier information of the uplink BWP activated currently and the activated downlink BWP may be different, but the identifier information of the downlink BWP activated currently is the same as the identifier information of the BWP corresponding to the first search space, which ensures that the terminal switches the downlink BWP activated currently to a downlink BWP capable of monitoring a PDCCH when performing BFR RACH.

In an implementation of the present disclosure, switching the second BWP to the active state or maintaining the second BWP in the active state unchanged includes the following two cases.

1) Switching the second BWP from an inactive state to the active state if the second BWP is in the inactive state.

2) Maintaining the second BWP in the active state unchanged if the second BWP is in the active state.

In an implementation, a downlink BWP activated currently is switched to a third BWP when the first BWP is in the active state, identifier information of the third BWP is the same as identifier information of the first BWP, the identifier information of the third BWP is different from identifier information of the second BWP (that is, the identifier information of the uplink BWP activated currently are the same as that of the downlink BWP, however, the downlink BWP does not have identifier information corresponding to the first search space in the first configuration information), and then the terminal initiates a second random access procedure (being distinct from the above-mentioned random access procedure), wherein the second random access procedure is a contention-based random access procedure.

The technical solution of an implementation of the present disclosure will be illustrated with reference to below specific application examples.

APPLICATION EXAMPLE 1

1. BeamFailureRecoveryConfig (i.e., first configuration information) is configured on an uplink BWP, such as an uplink BWP n (i.e., a first BWP). Herein, recoverySearchSpaceId (i.e., identifier information of a first search space) in the BeamFailureRecoveryConfig corresponds to a downlink BWP, such as a downlink BWP m (i.e., a second BWP), m and n are indexes of the BWPs.

2. That m=n is ensured by using network configuration.

3. When a condition for triggering the BFR RACH is satisfied, if BeamFailureRecoveryConfig is configured on the uplink BWP activated currently, that is, the uplink BWP activated currently is the uplink BWP n and the downlink BWP activated currently is the BWP x, x is assumed not equal to m, and then the terminal switches the downlink BWP x activated currently to the downlink BWP m.

4. The terminal performs the BFR RACH process on the uplink BWP n and the downlink BWP m, m=n.

APPLICATION EXAMPLE 2

1. BeamFailureRecoveryConfig (i.e., first configuration information) is configured on an uplink BWP, such as an uplink BWP n (i.e., a first BWP). Herein, recoverySearchSpaceId (i.e., identifier information of a first search space) in the BeamFailureRecoveryConfig corresponds to a downlink BWP, such as a downlink BWP m (i.e., a second BWP), m may be equal to n or not equal to n, and m and n are indexes of the BWPs.

2. When a condition for triggering the BFR RACH is satisfied, if BeamFailureRecoveryConfig is configured on the uplink BWP activated currently, that is, the uplink BWP activated currently is the uplink BWP n and the downlink BWP activated currently is the BWP x, x is assumed not equal to m, and then the terminal switches the downlink BWP x activated currently to the downlink BWP m.

3. The terminal performs the BFR RACH process on the uplink BWP n and the downlink BWP m.

Figure 3:
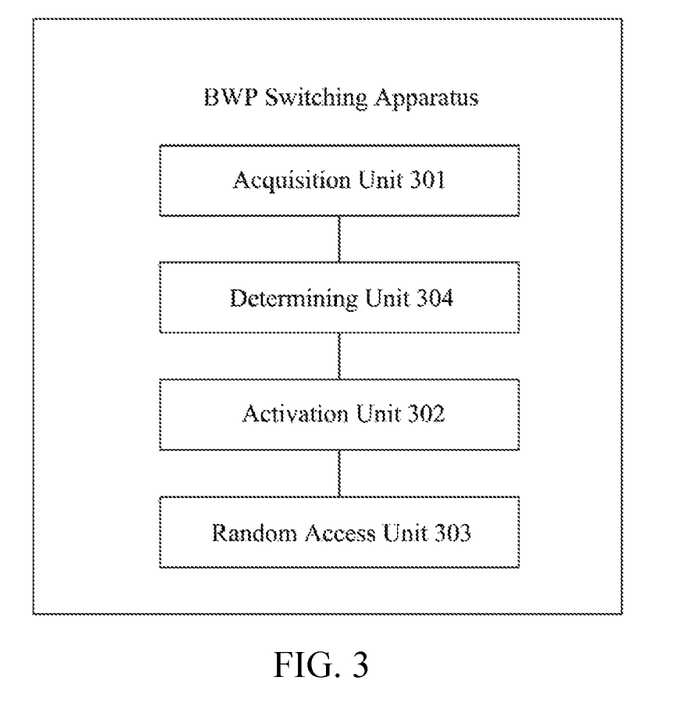
FIG. 3 is a schematic diagram of composition of a structure of a BWP switching apparatus of an implementation of the present disclosure.

FIG. 3 is a schematic diagram of a structure of composition of a BWP switching apparatus provided by an implementation of the present disclosure. As shown in FIG. 3, the BWP switching apparatus includes: an acquisition unit 301, an activation unit 302, and a random access unit 303.

The acquisition unit 301 is configured to acquire first configuration information, wherein the first configuration information includes first resource information and identifier information of a first search space, the first resource information is configured to initiate a random access procedure, the identifier information of the first search space is configured to detect a downlink control channel, the first configuration information corresponds to a first BWP, and the first search space corresponds to a second BWP.

The activation unit 302 is configured to switch the second BWP to an active state or maintain the second BWP in the active state unchanged when the first BWP is in the active state.

The random access unit 303 is configured to perform the random access procedure on the first BWP and the second BWP.

In an implementation, identifier information of the first BWP is the same as identifier information of the second BWP; or identifier information of the first BWP is different from identifier information of the second BWP.

In an implementation, the activation unit 302 is configured to switch the second BWP from an inactive state to the active state if the second BWP is in the inactive state, or maintain the second BWP in the active state unchanged if the second BWP is in the active state.

In an implementation, the apparatus further includes: a determining unit 304, configured to determine whether an uplink BWP activated currently is the first BWP when a random access condition triggered by Beam Failure Recovery (BFR) is satisfied.

In an implementation, the acquisition unit 301 is configured to acquire the first configuration information from a network device.

In an implementation, the activation unit 302 is configured to switch a downlink BWP activated currently to a third BWP when the first BWP is in the active state, wherein identifier information of the third BWP is the same as identifier information of the first BWP, and the identifier information of the third BWP is different from identifier information of the second BWP.

The random access unit 303 is further configured to initiate a second random access procedure, wherein the second random access procedure is a contention-based random access procedure.

Those skilled in the art should understand that the relevant description of the BWP switching apparatus of the implementation of the present disclosure may be understood with reference to the relevant description of the BWP switching method of the implementation of the present disclosure.

Figure 4:
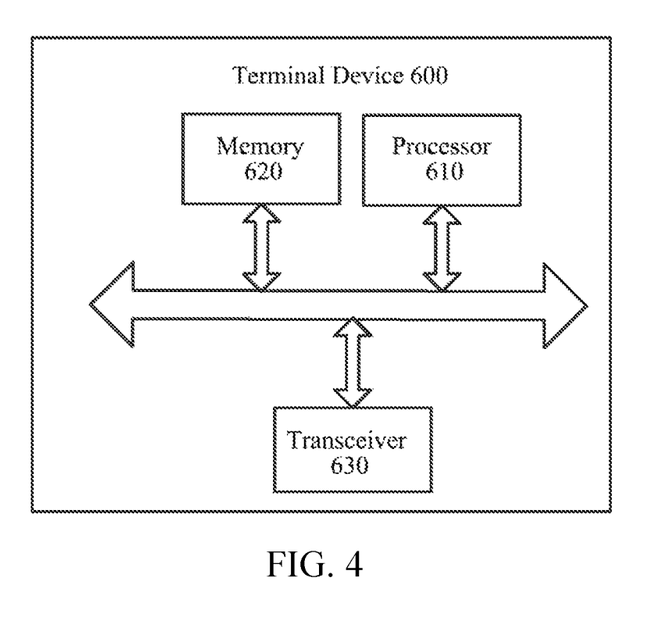
FIG. 4 is a schematic diagram of a structure of a terminal device provided by an implementation of the present disclosure.

FIG. 4 is a schematic structural diagram of a terminal device 600 provided by an implementation of the present disclosure. The terminal device 600 shown in FIG. 4 includes a processor 610, and the processor 610 may call and run a computer program from a memory to implement the method in the implementation of the present disclosure.

Optionally, as shown in FIG. 4, the terminal device 600 may further include a memory 620. The processor 610 can call and run a computer program from the memory 620 to implement the method in the implementation of the present disclosure.

The memory 620 may be a separate device independent of the processor 610 or may be integrated in the processor 610.

Optionally, as shown in FIG. 4, the terminal device 600 may further include a transceiver 630, and the processor 610 may control the transceiver 630 to communicate with other devices. Specifically, the transceiver 630 may send information or data to other devices or receive information or data sent by other devices.

The transceiver 630 may include a transmitter and a receiver. The transceiver 630 may further include antennas, and the number of antennas may be one or more.

Optionally, the terminal device 600 may be a network device of the implementation of the present disclosure, and the terminal device 600 may implement the corresponding processes implemented by the network device in various methods of the implementation of the present disclosure, which will not be repeated here for brevity.

Optionally, the terminal device 600 may be specifically a mobile terminal/terminal device of the implementation of the present disclosure, and the terminal device 600 may implement the corresponding processes implemented by the mobile terminal/terminal device in the various methods of the implementation of the present disclosure, which will not be repeated here for brevity.

Figure 5:
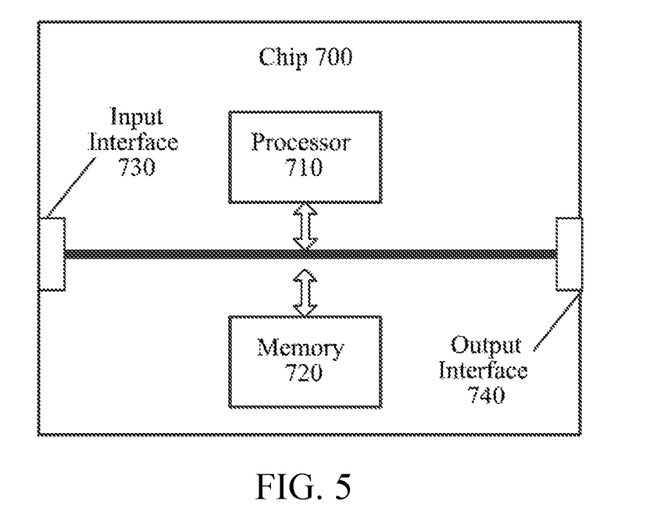
FIG. 5 is a schematic diagram of a structure of a chip of an implementation of the present disclosure.

FIG. 5 is a schematic diagram of a structure of a chip of an implementation of the present disclosure. A chip 700 shown in FIG. 5 includes a processor 710. The processor 710 may call and run a computer program from a memory to implement the method in the implementation of the present disclosure.

Optionally, as shown in FIG. 5, the chip 700 may further include a memory 720. The processor 710 may call and run a computer program from the memory 720 to implement the method in the implementation of the present disclosure.

The memory 720 may be a separate device independent of the processor 710 or may be integrated in the processor 710.

Optionally, the chip 700 may further include an input interface 730. The processor 710 may control the input interface 730 to communicate with other devices or chips. Specifically, the processor 710 may acquire information or data sent by other devices or chips.

Optionally, the chip 700 may further include an output interface 740. The processor 710 may control the output interface 740 to communicate with other devices or chips. Specifically, the processor 710 may output information or data to other devices or chips.

Optionally, the chip may be applied in a network device of the implementation of the present disclosure, and the chip may implement the corresponding processes implemented by the network device in various methods of the implementation of the present disclosure, which will not be repeated here for brevity.

Optionally, the chip may be applied in a mobile terminal/terminal device of the implementation of the present disclosure, and the chip may implement the corresponding processes implemented by the mobile terminal/terminal device in the various methods of the implementation of the present disclosure, which will not be repeated here for brevity.

It should be understood that the chip mentioned in the implementation of the present disclosure may be referred to as a system-level chip, a system chip, a chip system or a system-on-chip, etc.

Figure 6:
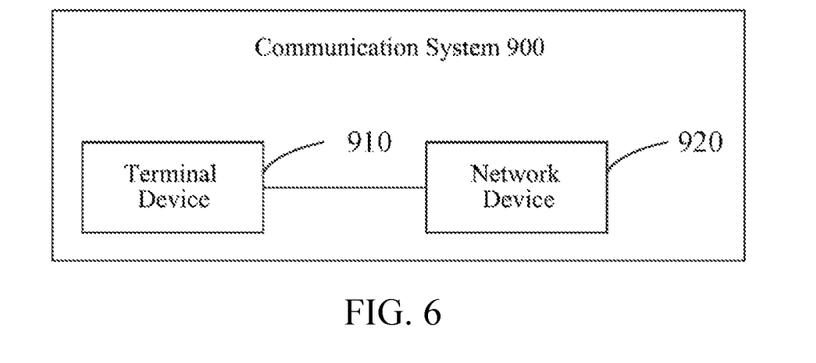
FIG. 6 is a schematic block diagram of a communication system provided by an implementation of the present disclosure.

FIG. 6 is a schematic block diagram of a communication system 900 provided by an implementation of the present disclosure. As shown in FIG. 9, the communication system 900 may include a terminal device 910 and a network device 920.

Herein, the terminal device 910 may be configured to implement the corresponding functions implemented by the terminal device in the above-mentioned method, and the network device 920 may be configured to implement the corresponding functions implemented by the network device in the above-mentioned method, which will not be repeated here for brevity.

It should be understood that the processor in an implementation of the present disclosure may be an integrated circuit chip with a capability for processing signals. In a implementation process, the acts of the method implementations described above may be accomplished by integrated logic circuits of hardware in the processor or instructions in the form of software. The processor may be a general purpose processor, a Digital Signal Processor (DSP), an Application Specific Integrated Circuit (ASIC), a Field Programmable Gate Array (FPGA), or another programmable logic device, a discrete gate, or a transistor logic device, or a discrete hardware component. The processor may implement or perform various methods, acts and logic block diagrams disclosed in implementations of the present disclosure. The general purpose processor may be a microprocessor, or the processor may be any conventional processor or the like. The acts of the method disclosed in connection with the implementations of the present disclosure may be directly embodied by the execution of the hardware decoding processor, or by the execution of a combination of hardware and software modules in the decoding processor. The software modules may be located in a storage medium commonly used in the art, such as a random access memory, a flash memory, a read-only memory, a programmable read-only memory, or an electrically erasable programmable memory, or a register. The storage medium is located in a memory, and the processor reads information in the memory and completes the acts of the above method in combination with its hardware.

It should be understood that the memory in implementations of the present disclosure may be a transitory memory or non-transitory memory, or may include both transitory and non-transitory memories. The non-transitory memory may be a Read-Only Memory (ROM), Programmable ROM (PROM), an Erasable Programmable ROM (EPROM), an Electrically EPROM (EEPROM), or a flash memory. The transitory memory may be a Random Access Memory (RAM) which serves as an external cache. As an example, but not as a limitation, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memories of the systems and methods described herein are intended to include, but not limited to, these and any other suitable types of memories.

It should be understood that, the foregoing memory is an example for illustration and should not be construed as limiting. For example, optionally, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, memories in the implementations of the present disclosure are intended to include, but are not limited to, these and any other suitable types of memories.

An implementation of the present disclosure further provides a computer readable storage medium configured to store a computer program.

Optionally, the computer readable storage medium may be applied in a network device of the implementation of the present disclosure, and the computer program enables the computer to perform the corresponding processes implemented by the network device in various methods of the implementation of the present disclosure. For the sake of brevity, it will not be repeated here.

Optionally, the computer readable storage medium may be applied in a mobile terminal/terminal device of the implementation of the present disclosure, and the computer program enables the computer to perform the corresponding processes implemented by the mobile terminal/terminal device in various methods of the implementation of the present disclosure. For the sake of brevity, it will not be repeated here.

An implementation of the present disclosure also provides a computer program product including computer program instructions.

Optionally, the computer program product may be applied in a network device of the implementation of the present disclosure, and the computer program instructions enable the computer to perform the corresponding processes implemented by the network device in various methods of the implementation of the present disclosure. For the sake of brevity, it will not be repeated here.

Optionally, the computer program product may be applied in a mobile terminal/terminal device of the implementation of the present disclosure, and the computer program instructions enable the computer to perform the corresponding processes implemented by the mobile terminal/terminal device in various methods according to the implementation of the present disclosure. For the sake of brevity, it will not be repeated here.

An implementation of the present disclosure also provides a computer program.

Optionally, the computer program may be applied in a network device of the implementation of the present disclosure. When the computer program is run on the computer, the computer is enabled to perform the corresponding processes implemented by the network device in various methods of the implementation of the present disclosure. For the sake of brevity, it will not be repeated here.

Optionally, the computer program may be applied in a mobile terminal/terminal device of the implementation of the present disclosure. When the computer program is run on the computer, the computer is enabled to perform the corresponding processes implemented by the mobile terminal/terminal device in various methods of the implementation of the present disclosure. For the sake of brevity, it will not be repeated here.

Those of ordinary skill in the art will recognize that the example elements and algorithm acts described in combination with the implementations disclosed herein can be implemented in electronic hardware, or a combination of computer software and electronic hardware. Whether these functions are executed in hardware or software depends on the specific application and design constraints of the technical solutions. Skilled artisans may use different methods to implement the described functions in respect to each particular application, but such implementation should not be considered to be beyond the scope of the present disclosure.

Those skilled in the art may clearly understand that for convenience and conciseness of description, the specific working processes of the systems, apparatuses and units described above may refer to the corresponding processes in the method implementations and will not be described here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device and the like) to execute all or part of the acts of the method described in various implementations of the present disclosure. The aforementioned storage medium includes various medium capable of storing program codes, such as a U disk, a mobile hard disk, a Read-Only Memory (ROM), a Random Access Memory (RAM), a magnetic disk, or an optical disk.

What are described above are merely example implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be subject to the protection scope of the claims.

The invention claimed is:

1. A Band Width Part (BWP) switching method, wherein the method comprises:
   acquiring Beam Failure Recovery (BFR) configuration information by a terminal device, wherein the BFR configuration information comprises first resource information and identifier information of a first search space, the first resource information is configured for initiating a random access procedure, the identifier information of the first search space is configured to detect a downlink control channel, the BFR configuration information corresponds to an uplink BWP, and the first search space corresponds to a downlink BWP, and wherein the uplink BWP is in an active state; and
   if the downlink BWP is not in an active state, switching the downlink BWP to an active state or if the downlink BWP is in an active state, maintaining the downlink BWP in the active state, and performing the random access procedure on the uplink BWP and the downlink BWP.

2. The method according to claim 1, wherein:
the uplink BWP is configured with the BFR configuration information.

3. The method according to claim 1, wherein
identifier information of the uplink BWP is the same as identifier information of the downlink BWP.

4. The method according to claim 1, further comprising:
switching the downlink BWP from an inactive state to the active state if the downlink BWP is in the inactive state; or
maintaining the downlink BWP in the active state if the second BWP is in the active state.

5. The method according to claim 1, further comprising
determining, by the terminal device, whether the uplink BWP is currently activated when a random access condition triggered by BFR is satisfied, and
switching the downlink BWP to the active state or maintaining the downlink BWP in the active state by the terminal device when the uplink BWP is in the active state, and performing the random access procedure on the uplink BWP and the downlink BWP.

6. The method according to claim 5, wherein when the random access condition triggered by the BFR is satisfied, the terminal device determines whether the uplink BWP activated currently is configured with the BFR configuration information.

7. The method according to claim 1, further comprising:
acquiring, by the terminal device, the BFR configuration information from a network device.

8. The method according to claim 1, further comprising:
switching the downlink BWP that is currently activated to a third BWP when the uplink BWP is in the active state, wherein identifier information of the third BWP is the same as identifier information of the uplink BWP, and the identifier information of the third BWP is different from identifier information of the downlink BWP, and then initiating, by the terminal device, a second random access procedure, wherein the second random access procedure is a contention-based random access procedure.

9. A Band Width Part (BWP) switching apparatus, wherein the apparatus comprises:
an acquisition circuit, configured to acquire Beam Failure Recovery (BFR) configuration information, wherein the BFR configuration information comprises first resource information and identifier information of a first search space, the first resource information is configured for initiating a random access procedure, the identifier information of the first search space is configured to detect a downlink control channel, the first configuration information corresponds to an uplink BWP, and the first search space corresponds to a downlink BWP, and wherein the uplink BWP is in an active state;

an activation circuit, configured to, if the downlink BWP is not in an active state, switch the downlink BWP to the active state or maintain the second BWP in the active state; and a random access circuit, configured to perform the random access procedure on the uplink BWP and the downlink BWP.

10. The apparatus according to claim 9, wherein:
the uplink BWP is configured with the BFR configuration information.

11. The apparatus according to claim 9, wherein, identifier information of the uplink BWP is the same as identifier information of the downlink BWP.

12. The apparatus according to claim 9, wherein the activation circuit is configured to switch the downlink BWP from an inactive state to the active state if the downlink BWP is in the inactive state, or maintain the downlink BWP in the active state if the second BWP is in the active state.

13. The apparatus according to claim 9, wherein the apparatus further comprises:

a determining circuit, configured to determine whether the uplink BWP is currently activated when a random access condition triggered by BFR is satisfied.

14. The apparatus according to claim 13, wherein when the random access condition triggered by the BFR is satisfied, the determining circuit determines whether the uplink BWP activated currently is configured with the BFR configuration information.

15. The apparatus according to claim 9, wherein the acquisition circuit is configured to acquire the BFR configuration information from a network device.

16. The apparatus according to claim 9, wherein,
the activation circuit is configured to switch the downlink BWP that is currently activated to a third BWP when the uplink BWP is in the active state, wherein identifier information of the third BWP is the same as identifier information of the uplink BWP, and the identifier information of the third BWP is different from identifier information of the downlink BWP; and the random access circuit is further configured to initiate a second random access procedure, wherein the second random access procedure is a contention-based random access procedure.

* * * * *